US006915692B2

(12) United States Patent
Ricco et al.

(10) Patent No.: US 6,915,692 B2
(45) Date of Patent: Jul. 12, 2005

(54) LEVEL-SENSOR DEVICE FOR A LIQUID-FUEL TANK, PARTICULARLY FOR A SYSTEM FOR SUPPLYING LPG TO AN INTERNAL-COMBUSTION ENGINE

(75) Inventors: Mario Ricco, Casamassima (IT); Sisto Luigi De Matthaeis, Modugno (IT); Annunziata Anna Satriano, Orbassano (IT); Claudio Amorese, Corato (IT); Onofrio De Michele, Castellana Grotte (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 1 day.

(21) Appl. No.: 10/773,309

(22) Filed: Feb. 9, 2004

(65) Prior Publication Data

US 2004/0182152 A1 Sep. 23, 2004

(30) Foreign Application Priority Data

Feb. 11, 2003 (IT) ...................................... TO2003A0097

(51) Int. Cl.$^7$ .......................... G01F 23/30; G01F 23/56; G01F 23/60

(52) U.S. Cl. ............................... 73/314; 73/319; 73/313
(58) Field of Search ......................... 73/305, 313, 314, 73/319, 322.5

(56) References Cited

U.S. PATENT DOCUMENTS

| 3,200,645 | A | * | 8/1965 | Levins ......................... 73/313 |
| 3,976,963 | A | * | 8/1976 | Kubler ......................... 335/206 |
| 4,702,107 | A | * | 10/1987 | Guerrini et al. .............. 73/319 |
| 5,829,303 | A | * | 11/1998 | Fraser .......................... 73/319 |

* cited by examiner

Primary Examiner—Hezron Williams
Assistant Examiner—Tamiko Bellamy
(74) Attorney, Agent, or Firm—Sughrue Mion, PLLC

(57) ABSTRACT

In a tank for liquid fuel, particularly a tank for LPG in a system for supply of LPG to the internal-combustion engine of a motor vehicle, the level-sensor device comprises a floating member guided so as to move in a substantially vertical direction within the tank according to the variations of level, and transducer means consisting of an aligned series of reed relays that are activated selectively by one or more permanent magnets carried by the floating member.

7 Claims, 2 Drawing Sheets

LEVEL-SENSOR DEVICE FOR A LIQUID-FUEL TANK, PARTICULARLY FOR A SYSTEM FOR SUPPLYING LPG TO AN INTERNAL-COMBUSTION ENGINE

CROSS REFERENCE TO RELATED APPLICATION

This application claims priority under 35 U.S.C. 119(e) to Italian Patent Application No. 2003A000097 filed on Feb.11, 2003. The content of which is incorporated herein by reference.

BACKGROUND OF THE INVENTION

The present invention relates to level-sensor devices for liquid-fuel tanks, particularly for systems of LPG supply to internal-combustion engines of motor vehicles.

SUMMARY OF THE INVENTION

In particular, the invention relates to level-sensor devices of the type referred to above, in which there is provided a floating member which can move vertically within the tank according to the variations of level of the fuel in the tank, and transducer means that are sensitive to the movement of the float for issuing an electrical signal that indicates the position of the float in the tank.

For some time now there have been known and used tanks for systems of LPG supply, in which the float is carried at the end of an arm that is mounted oscillating vertically on a supporting structure provided within the tank. In said known devices, the transducer means consist of a potentiometer, which is sensitive to the position of the aforesaid oscillating arm. A device of this type is, for example, illustrated in the European patent No. EP 0 922 851 B1 and in the corresponding U.S. Pat. No. 6,050,237 in the name of the present applicant. The experience acquired in the meantime has shown that there may at times be obtained measurements that are not altogether precise of the level of fuel present in the tank on account, on the one hand, of the existence of a certain friction in the articulation of the arm carrying the float and, on the other hand, of the relatively low specific weight of the LPG, which gives rise to a relatively low thrust on the float. For the above reasons, the measurement supplied by the known device can at times not be completely reliable. Another drawback of known solutions is that they entail each time the design of the device according to the specific structure of the tank.

With the purpose of overcoming said drawbacks, the subject of the present invention is a level-sensor device for a liquid-fuel tank, particularly for a system of LPG supply to an internal-combustion engine, having all the characteristics that have been mentioned at the beginning of the present description and being further characterized in that the floating member has a body vertically slidably guided in a within the tank, in that the aforesaid transducer means comprise a vertically aligned series of electrical magnetic-actuation switches of a reed-relay type, arranged adjacent to the float, and in that the body of the float comprises magnetic means designed to activate selectively one or more of the aforesaid magnetic-actuation switches according to the position of the float with respect to the aforesaid vertical series of electrical magnetic-actuation switches.

Thanks to the characteristics referred to above, the drawbacks of the known solutions are completely overcome. The body of the float can be guided vertically within the tank without any sliding contact subject to friction. For example, in the preferred embodiment, the body of the float has an annular conformation and is mounted with play on a central column consisting of a tubular element made of non-magnetic material containing within it the series of electrical magnetic-actuation switches. The floating assembly of the float on said column, on the one hand, guides the float, forcing it to move in a vertical direction, and on the other hand, eliminates the friction present in the known solutions. In this way, notwithstanding the relatively low specific weight of the LPG, the float is able to "sense" even minimal variations of level within the tank and is, in particular, able to give rise to a reliable warning when the level drops below a minimum threshold value corresponding to the activation of the "reserve" warning light on the instrument dashboard of the motor vehicle.

Preferably, in the case of the aforesaid preferred embodiment, in which the float has an annular body, said body has a cylindrical conformation with a diameter/height ratio that is optimized in order to obtain the maximum displacement possible of liquid for a small variation in height.

Once again preferably, the assembly consisting of the column containing the series of reed relays with the annular float mounted thereon is enclosed within a cylindrical container having in the bottom part of its wall one or more openings for communication, via which the internal capacity of said container communicates with the remaining space within the tank. Thanks to said solution, the liquid on which the floating member floats is less subject to shaking deriving from the movements of the motor vehicle on which the tank is installed.

BRIEF DESCRIPTION OF THE DRAWINGS

Further characteristics and advantages of the invention will emerge from the ensuing description, with reference to the annexed drawings, which are provided purely by way of non-limiting example and in which.

DETAILED DESCRIPTION OF THE INVENTION

Figure 1:
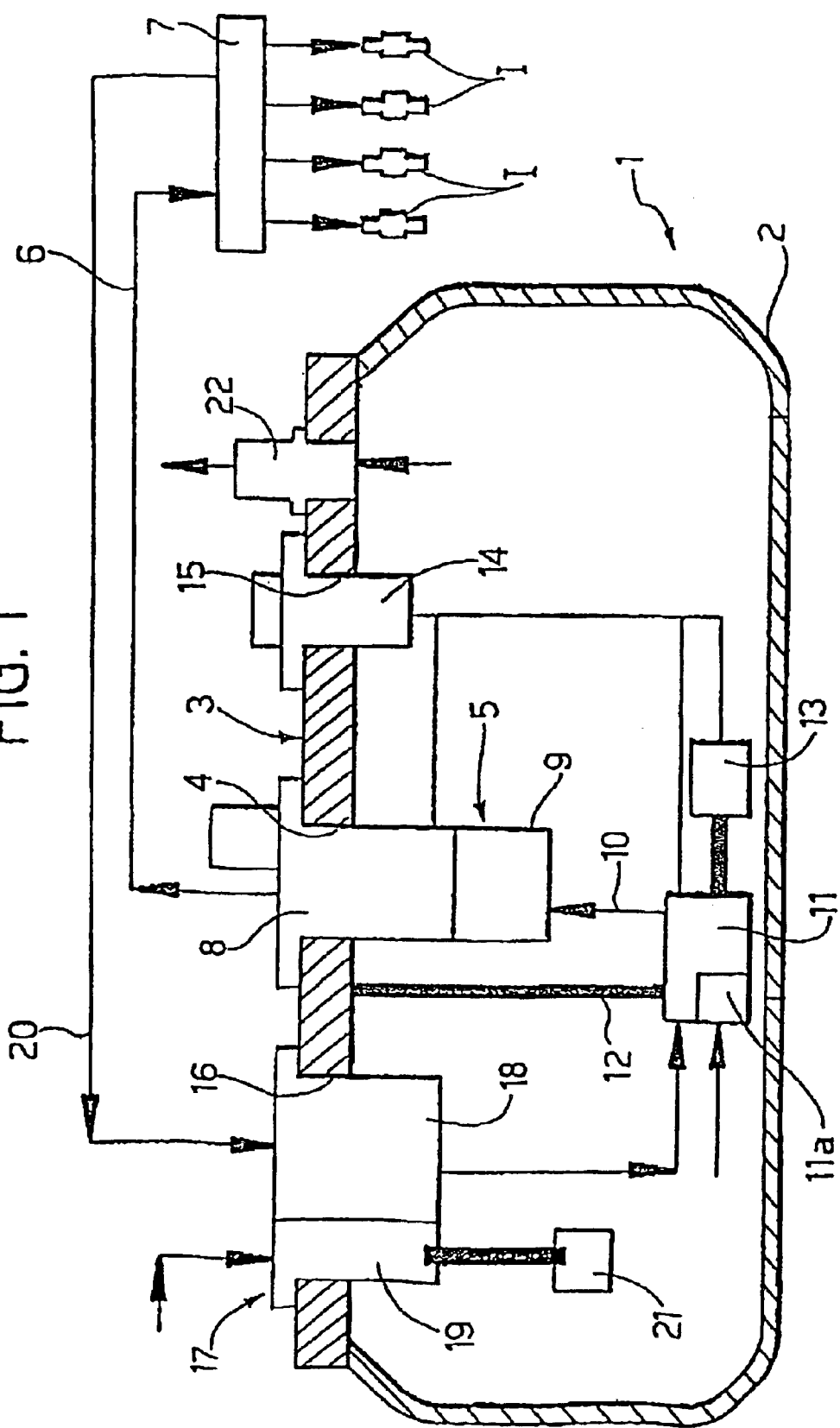
FIG. 1 is a cross-sectional schematic view of a tank of a system of LPG supply to the engine of a motor vehicle, according to the known art.

In FIG. 1, the number 1 designates as a whole an LPG fuel tank built according to the known art, for supplying the LPG to a plurality of injectors I associated to the various cylinders of an internal-combustion engine of a motor vehicle. The tank 1 has a hollow structure 2 made so as to guarantee tightness at the working pressures expected for a system of the type in question. The hollow structure 2 has a top opening closed by a service flange 3 carrying the various elements for fitting and connection of the tank to the supply system. For this purpose, the tank 1 has a first through opening 4, through which there is installed the structure of an assembly 5 connected to a line 6 for delivery of the LPG to a distribution manifold or rail 7, which distributes the LPG between the various injectors I. The assembly 5 includes a shut-off solenoid valve 8 designed to close, interrupting communication of the tank with the outside environment in pre-determined emergency conditions, as well as a flow-limiting valve 9. The assembly 5 receives the LPG through the line 10 from the pump 11, which is controlled by an electric motor 11a, the structure of which is connected, by means of a connection element 12, to the service flange 3. The installation of the pump 11 can in any case be made in any other known way. Also connected to the structure of the pump 11 is the structure of a sensor device 13 for sensing the level of LPG. The electrical supply of the solenoid valve 8, of the pump 11, and of the sensor 13 is guaranteed by an electrical connector 14, which is mounted through a through opening 15 of the service flange 3. The latter moreover has a further through opening 16, within which there is installed an assembly 17 including two valves 18, 19. The valve 18 is a return valve, which is connected to a line 20 for the flow, within the tank, of the LPG supplied in excess to the rail 7. The valve 19 is the valve used for filling the tank and is associated to a further level-sensor 21. Also associated to the flange 3 is a safety valve 22, which prevents the pressure within the tank from exceeding a pre-determined threshold value.

FIG. 1 shows a traditional embodiment of a tank, in which the flange 3 has through holes traversed by the various components described above. The tank could moreover also have the innovative structure that has formed the subject of the preceding Italian patent application No. T02001A000360 in the name of the present applicant, in which at least some of the aforesaid components are fixed to the bottom surface of the plate, without passing through it.

Figure 2:
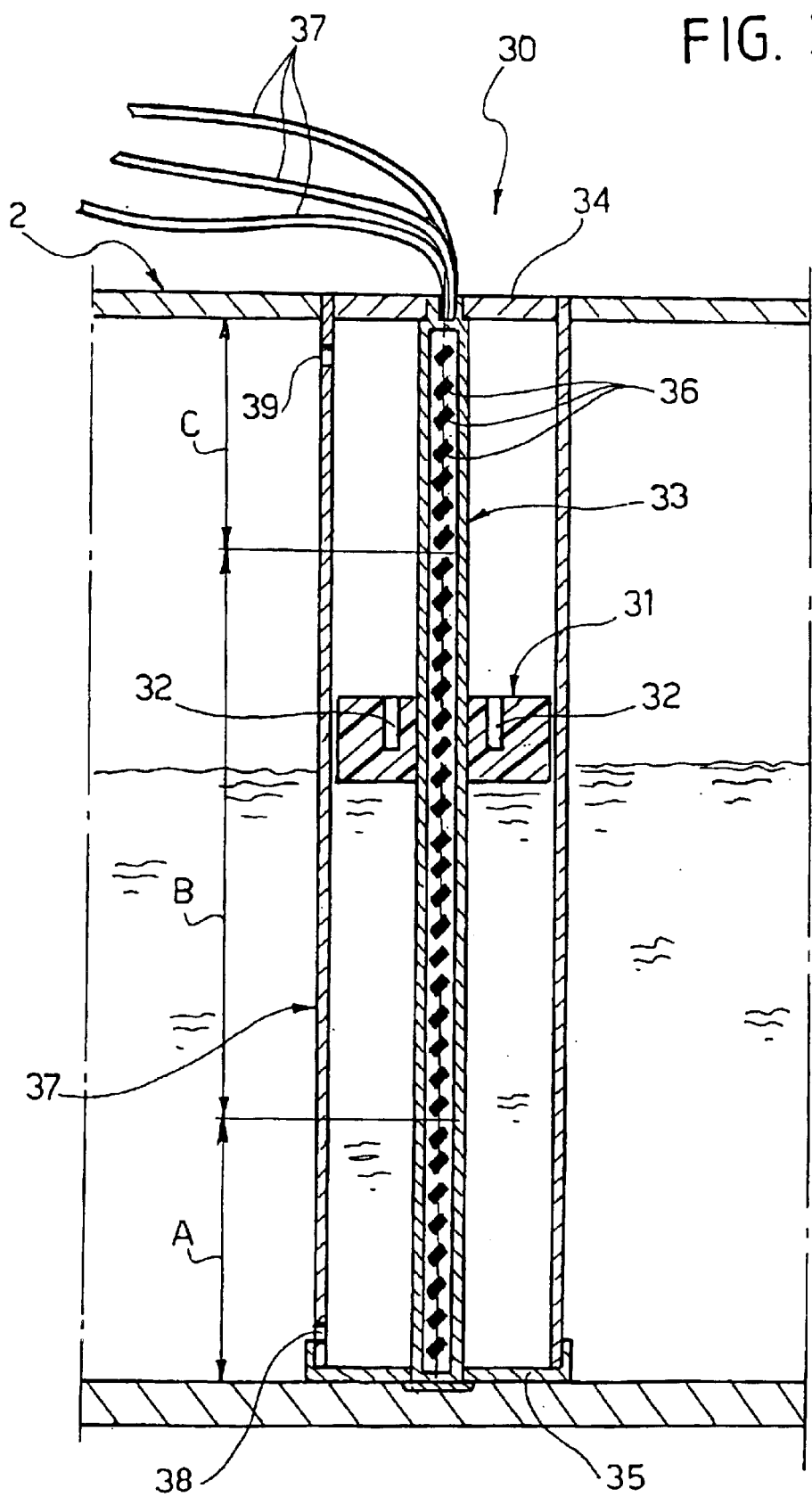
FIG. 2 is a schematic cross-sectional view of a portion of tank for LPG, in which there is installed a preferred embodiment of the level-sensor device according to the invention.

According to the invention, within the tank 2 there is provided a level-sensor device, for example of the type illustrated in FIG. 2. In this case, the sensor device 13 illustrated in FIG. 1 is completely eliminated, and the level-sensor device indicated as a whole by the reference number 30 in FIG. 2 is used. This has a structure completely independent both of that of the pump 11 illustrated in FIG. 1 and of that of any other component present within the tank.

In the case of the invention, the level-sensor device has a floating member 31 with an annular cylindrical body, in which there are embedded one or more permanent magnets 32. The case illustrated shows two magnets 32 arranged at 180° with respect to one another, but it would obviously be possible to provide, for example, three magnets arranged at 120° with respect to one another or any other number of permanent magnets arranged at angular distances apart from one another.

The annular body 31 of the float is mounted in a slidable way, with play, on a vertical guide column 33 consisting of a tubular element made of non-magnetic material, the opposite ends of which are fixed centrally to a top plate 34 and to a bottom plate 35, which are fixed in any known way to the structure of the tank 2. As already mentioned, there exists a play (not visible in the drawing) between the surface of the central opening of the annular body of the float 31 and the outer surface of the tubular element 33, so that the float 31 is mounted floating on the guide column 33, thus being forced, on the one hand, to move only in the vertical direction and so as not to produce, on the other hand, any significant friction of sliding against the surface of the guide column 33.

Once again according to the invention, within the tubular element made of plastic material 33 constituting the guide for the vertical movement of the float 31, there is set an aligned series of reed relays 36 that are connected to one another in a circuit, the ends of which are connected to conductors 37 coming out of the top end of the tubular element 33 and out of the top plate 34, for connection to an electronic control unit (not illustrated). The aligned arrangement of reed relays enables an electrical signal indicating the position of the float 31 along the vertical column 33 to be sent to the conductors 37. In fact, the permanent magnets 32 carried by the float 31 activate selectively one or more reed relays 36 according to the position of the float with respect to the column 33. The electrical signal at output from the device thus depends upon the position of the float.

In the preferred embodiment that is illustrated in the drawings, the assembly consisting of the supporting column 33 with the float 31 mounted thereon is enclosed within a cylindrical container 37, for example made of plastic material, which has holes 38, 39, of which at least one 38 is in its bottom part for communication of the internal cavity of the container 37 with the remaining space within the tank 2. In this way, as represented schematically in the figure, the liquid within the container 37 is less sensitive to the shaking resulting from the movements of the motor vehicle on which the tank is installed.

Once again in the case of the preferred embodiment, the reed relays 36 are distributed with a different pitch in different portions of the length of the supporting column 33. More precisely, in the end portions indicated by A and C in FIG. 2, the reed relays are arranged with a relatively small pitch, for example 5 mm apart, so as to enable a finer measurement when the LPG in the tank is reaching a minimum threshold value or when the level is reaching a maximum value, during refuelling of the vehicle. In the intermediate portion, designated by B, of the supporting column 33, the reed relays are instead arranged with a larger pitch, for example 10 mm.

In a concrete embodiment, the supporting column has an overall height of approximately 200 mm and includes a distribution of approximately twenty, for example eighteen, reed relays. The annular body of the float 31 has an external diameter of 48 mm, a height of 18 mm and a diameter of its internal opening of 13 mm. Of course, said dimensions can be amply varied. It is, however, desirable that the ratio external diameter/height of the float is optimized in order to obtain the maximum displacement of liquid for the minimum height, for example at least greater than 1 and preferably less than 2.

Of course, without prejudice the principle of the invention, the details of construction and the embodiments may widely vary with respect to what is described and illustrated herein purely by way of example, without thereby departing from the scope of the present invention.

For example, the conformation and arrangement of the floating member could also be different from the one illustrated by way of example. Also the conformation and the arrangement of the structure that guides the vertical movement of the float could be completely different. The same applies to the structure carrying the series of reed relays.

What is claimed is:

1. A level-sensor device for a liquid-fuel tank, particularly for a system of LPG supply to the internal-combustion engine of a motor vehicle, comprising:

a floating member, which can move vertically within the tank following upon variations of level of the fuel in the tank; and transducer means sensitive to the movement of the floating member, for issuing an electrical signal indicating the position of the floating member in the tank, wherein:

the floating member has a body vertically slidably guided within the tank along a vertical guide column;

said transducer means comprise a vertically aligned series of electrical magnetic-actuation switches of a reed-relay type arranged in said column adjacent to the floating member;

the body of the floating member comprises magnetic means designed to activate selectively one or more of the aforesaid electrical magnetic-actuation switches according to its position with respect to the aligned series of said electrical magnetic-actuation switches, and wherein said electrical magnetic-actuation switches are arranged adjacent each other with a small pitch along top and bottom portions of said column and a larger pitch along a middle portion said column, to determine when the liquid has reached a minimum threshold value or a maximum threshold value.

2. The level-sensor device according to claim 1, wherein said floating member has an annular body guided on said vertical guide column that is engaged through the central opening of the annular body of the floating member.

3. The level-sensor device according to claim 2, wherein said guide column consists of a tubular element made of non-magnetic material and in that the aforesaid alignedseries of electrical magnetic-actuation switches is set within said tubular element.

4. The level-sensor device according to claim 2, wherein the aforesaid magnetic means consist of one or more permanent magnets embedded in the annular body of the floating member and arranged at angular distances apart around the central opening of said body.

5. The level-sensor device according to claim 4, wherein the annular body of the floating member has a cylindrical conformation with a ratio between the diameter of its base and its height at least greater than 1 and preferably greater than 2.

6. The level-sensor device according to claim 2, wherein the assembly consisting of the aforesaid supporting column and the floating member, which is installed in a slidable way on said supporting column, is enclosed within a cylindrical container having, in the proximity of its bottom end, at least one opening for communication of the cavity inside the cylindrical container with the remaining part of the space inside the tank.

7. A tank for LPG in a system for supply of LPG to the internal-combustion engine of a motor vehicle, wherein it is provided with a level-sensor device according to claim 1.

* * * * *